(12) United States Patent
Abe et al.

(10) Patent No.: US 11,597,331 B2
(45) Date of Patent: Mar. 7, 2023

(54) BONDED STRUCTURE, IMAGING APPARATUS, AND MOVEABLE BODY

(71) Applicant: KYOCERA Corporation, Kyoto (JP)

(72) Inventors: Hiroyuki Abe, Kawasaki (JP); Takahiro Okada, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/973,187

(22) PCT Filed: May 24, 2019

(86) PCT No.: PCT/JP2019/020746
§ 371 (c)(1),
(2) Date: Dec. 8, 2020

(87) PCT Pub. No.: WO2020/003838
PCT Pub. Date: Jan. 2, 2020

(65) Prior Publication Data
US 2021/0261068 A1    Aug. 26, 2021

(30) Foreign Application Priority Data

Jun. 27, 2018  (JP) .............................. JP2018-122336

(51) Int. Cl.
*B60R 11/04* (2006.01)
*H04N 5/225* (2006.01)
*B64D 47/08* (2006.01)

(52) U.S. Cl.
CPC ............ *B60R 11/04* (2013.01); *H04N 5/2253* (2013.01); *H04N 5/2254* (2013.01); *B64D 47/08* (2013.01)

(58) Field of Classification Search
CPC .... B60R 11/04; H04N 5/2253; H04N 5/2254; B64D 47/08
(Continued)

(56) References Cited

U.S. PATENT DOCUMENTS

| 8,110,933 B2 | 2/2012 | Tomura et al. |
| 10,720,394 B2 | 7/2020 | Okamura et al. |

(Continued)

FOREIGN PATENT DOCUMENTS

| CN | 108028231 A | 5/2018 |
| JP | 2006-332814 A | 12/2006 |

(Continued)

OTHER PUBLICATIONS

International Search Report issued in PCT/JP2019/020746; dated Aug. 6, 2019.

*Primary Examiner* — Joseph G Ustaris
*Assistant Examiner* — Matthew David Kim
(74) *Attorney, Agent, or Firm* — Studebaker & Brackett PC

(57) ABSTRACT

A bonded structure (14) includes a first member (15), a second member (16), and an adhesive body (17). The second member (16) includes a support (18). The support (18) includes a facing surface and a side surface. The facing surface faces the first member (15). The side surface is inclined outward as viewed from the first member side. The adhesive body (17) is located between the first member (15) and the second member (16). The adhesive body (17) extends from the facing surface to the side surface. The adhesive body (17) has a fillet shape at an end thereof by the side surface. The adhesive body (17) fixes the first member (15) to the second member (16).

5 Claims, 7 Drawing Sheets

(58) Field of Classification Search
USPC .......................................................... 348/148
See application file for complete search history.

(56) References Cited

U.S. PATENT DOCUMENTS

| | | | | |
|---|---|---|---|---|
| 2003/0132531 A1* | 7/2003 | Standing | ................. | H01L 24/37 |
| | | | | 257/676 |
| 2010/0025847 A1* | 2/2010 | Tomura | ................... | H01L 24/75 |
| | | | | 257/737 |
| 2012/0276951 A1* | 11/2012 | Webster | ............... | H04N 5/2257 |
| | | | | 455/556.1 |
| 2015/0326756 A1* | 11/2015 | Knutsson | ............. | H04N 5/2257 |
| | | | | 348/148 |
| 2018/0128998 A1* | 5/2018 | Furuyama | ............ | G02B 6/4256 |

FOREIGN PATENT DOCUMENTS

| | | |
|---|---|---|
| JP | 2007-019117 A | 1/2007 |
| JP | 2009-204658 A | 9/2009 |
| JP | 2014-186212 A | 10/2014 |
| KR | 10-2015-0030906 A | 3/2015 |
| WO | 2008078746 A1 | 7/2008 |

\* cited by examiner

BONDED STRUCTURE, IMAGING APPARATUS, AND MOVEABLE BODY

CROSS-REFERENCE TO RELATED APPLICATION

The present application claims priority to Japanese Patent Application No. 2018-122336 filed Jun. 27, 2018, the entire contents of which are incorporated herein by reference.

TECHNICAL FIELD

The present disclosure relates to a bonded structure, an imaging apparatus, and a moveable body.

BACKGROUND

During formation of a structure, a first member may be fixed to a second member. Adhesive may be used for the fixing to simplify production. For example, the use of adhesive to fix a circuit board with an image sensor mounted thereon to a housing that holds an optical system is known, as in patent literature (PTL) 1.

CITATION LIST

Patent Literature

PTL 1: JP 2014-186212 A

SUMMARY

A bonded structure according to a first aspect includes:
a first member;
a second member including a support, the support including a facing surface facing the first member and a side surface inclined outward as viewed from the first member; and
an adhesive body positioned between the first member and the support, extending from the facing surface to the side surface, having a fillet shape at an end of the adhesive body by the side surface, and fixing the first member to the second member.

An imaging apparatus according to a second aspect includes:
a bonded structure that includes a first member; a second member including a facing surface facing the first member and a support including a side surface inclined outward as viewed from the first member; and an adhesive body positioned between the first member and the support, extending from the facing surface to the side surface, having a fillet shape at an end of the adhesive body by the side surface, and fixing the first member to the second member;
an image sensor mounted on the first member; and
an imaging optical system including at least one optical element and held by the second member so that an image is formed on an optical detection surface of the image sensor.

A moveable body according to a third aspect includes an imaging apparatus, the imaging apparatus including:
a bonded structure that includes a first member; a second member including a facing surface facing the first member and a support including a side surface inclined outward as viewed from the first member; and an adhesive body positioned between the first member and the support, extending from the facing surface to the side surface, having a fillet shape at an end of the adhesive body by the side surface, and fixing the first member to the second member; an image sensor mounted on the first member; and an imaging optical system including at least one optical element and held by the second member so that an image is formed on an optical detection surface of the image sensor.

DETAILED DESCRIPTION

An embodiment of a fixed structure to which the present disclosure is applied is described below with reference to the drawings.

Figure 1:
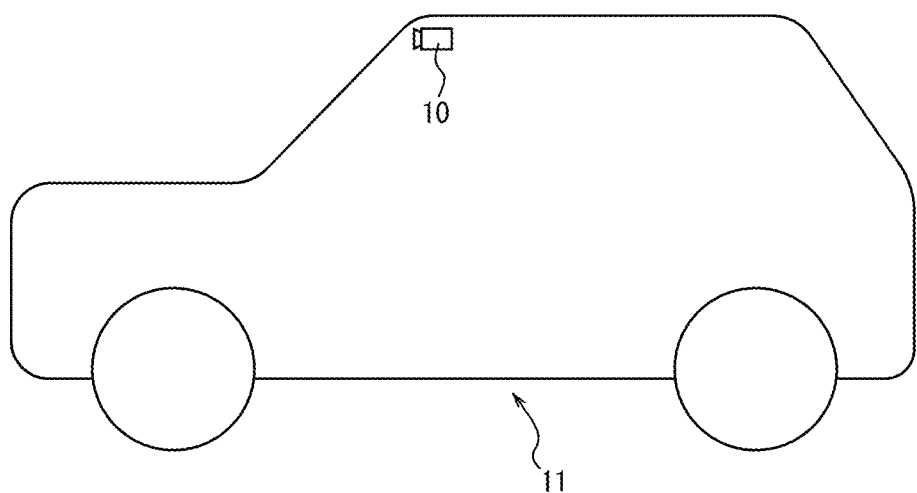
FIG. 1 is a layout diagram illustrating the mounting position, in a moveable body, of an imaging apparatus to which the bonded structure according to the present embodiment is applied.

The bonded structure according to an embodiment of the present disclosure is, for example, applied to an imaging apparatus. An imaging apparatus 10 to which the bonded structure according to the present embodiment is applied is, for example, mounted in a moveable body 11, as illustrated in FIG. 1.

The moveable body 11 may, for example, encompass vehicles, ships, and aircraft. Vehicles may, for example, include automobiles, industrial vehicles, railway vehicles, vehicles for daily life, and fixed-wing aircraft that run on a runway. Automobiles may, for example, include passenger vehicles, trucks, buses, motorcycles, and trolley buses. Industrial vehicles may, for example, include industrial vehicles for agriculture and for construction. Industrial vehicles may, for example, include forklifts and golf carts. Industrial vehicles for agriculture may, for example, include tractors, cultivators, transplanters, binders, combines, and lawnmowers. Industrial vehicles for construction may, for example, include bulldozers, scrapers, backhoes, cranes, dump cars, and road rollers. Vehicles may include man-powered vehicles. The types of vehicles are not limited to the above examples. For example, automobiles may include industrial vehicles that can be driven on the road. The same vehicle may also be included in multiple categories. Ships may, for example, include marine jets, boats, and tankers. Aircraft may, for example, include fixed-wing aircraft and rotorcraft.

Figure 2:
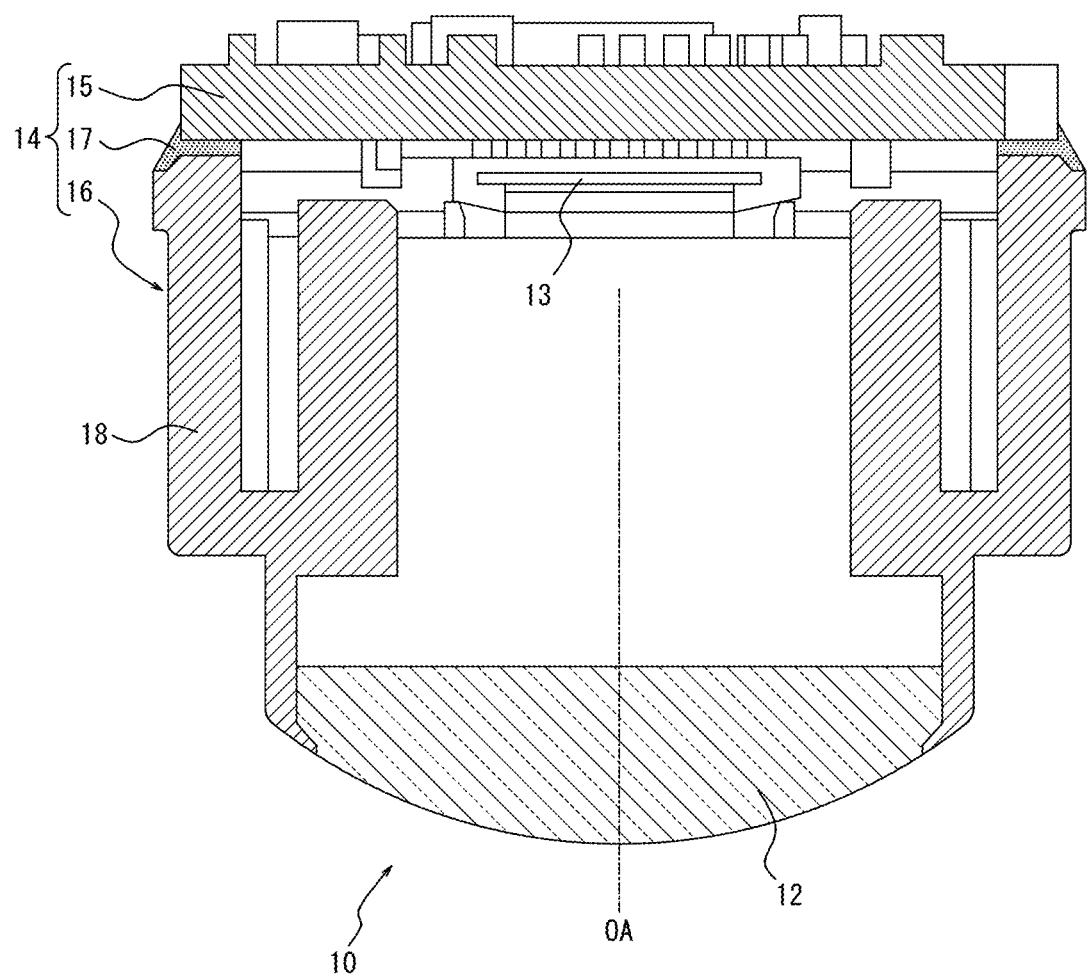
FIG. 2 is a cross-sectional diagram, taken along an optical axis, to illustrate the schematic configuration of the imaging apparatus of FIG. 1.

As illustrated in FIG. 2, the imaging apparatus 10 includes an imaging optical system 12, an image sensor 13, and a bonded structure 14.

The imaging optical system 12 includes at least one optical element, such as a lens. The imaging optical system 12 is designed and formed so that optical properties such as angle of view and depth of field become desired values. The imaging optical system 12 is held by a second member 16, which forms part of the below-described bonded structure 14, so that a subject image is formed on the image sensor 13.

The image sensor 13 is, for example, a charge coupled device (CCD) image sensor or a complementary metal oxide semiconductor (CMOS) image sensor. The image sensor 13 is mounted on a first member 15, which forms part of the below-described bonded structure 14. The image sensor 13 captures the subject image formed by the imaging optical system 12.

The bonded structure 14 includes the first member 15, the second member 16, and an adhesive body 17.

Figure 3:
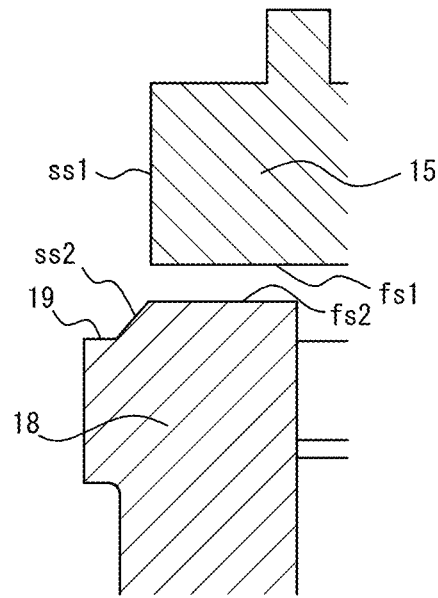
FIG. 3 is an enlarged cross-sectional diagram illustrating the bonded structure of FIG. 2 without an adhesive body.

As described above, the first member 15 is a circuit board, for example, on which the image sensor 13 is mounted. The first member 15 may include a flat surface fs1, as illustrated in FIG. 3. The first member 15 supports the image sensor 13 so that an optical detection surface of the image sensor 13 is parallel to the flat surface fs1. A side surface ss1 of the first member 15 may be perpendicular or inclined relative to the flat surface fs1.

As viewed from a direction perpendicular to the flat surface fs1 of the first member 15, the side surface ss1 of the first member 15 in the bonded structure 14 may be positioned inward from the edge of the adhesive body 17 on the support 18 side of the second member 16, described below. Furthermore, as viewed from the perpendicular direction, the side surface ss1 of the first member 15 in the bonded structure 14 may be positioned inward from a side surface ss2 of the support 18, described below. Inward from the side surface ss2 refers to being on the inside of the boundary line between the side surface ss2 and a facing surface fs2 of the support 18, or being on the facing surface fs2 side of the boundary line.

As illustrated in FIG. 2, the second member 16 is a lens case holding the imaging optical system 12, for example, as described above. The second member 16 may, for example, be formed by molding a resin. The second member 16 may be cylindrical overall, for example, and may hold the imaging optical system 12 so that the optical axis OA of the imaging optical system 12 and the shaft core overlap.

The second member 16 includes the support 18. The support 18 is, for example, formed around the shaft core. As illustrated in FIG. 3, the support 18 includes the facing surface fs2 and the side surface ss2.

The facing surface fs2 may include a flat surface perpendicular to the optical axis OA. The entire facing surface fs2 is perpendicular to the optical axis OA in the present embodiment. The facing surface fs2 faces the first member 15 in the bonded structure 14. Specifically, the facing surface fs2 may face the flat surface fs1 of the first member 15. The facing surface fs2 may be parallel to the flat surface fs1 of the first member 15.

Figure 4:
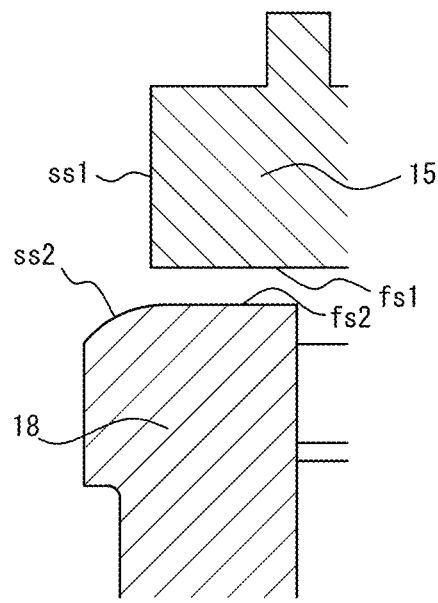
FIG. 4 is an enlarged cross-sectional diagram illustrating a first modification to the support of FIG. 3.
Figure 5:
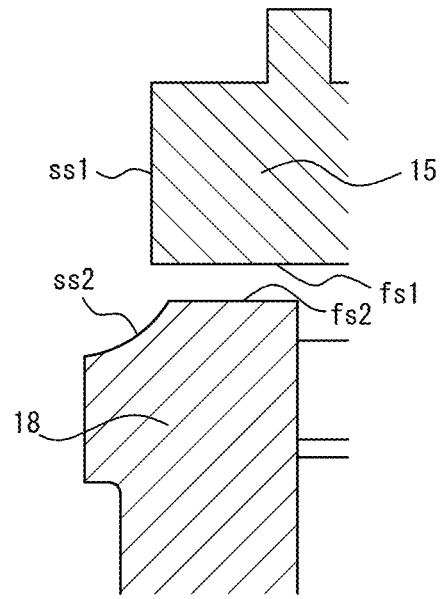
FIG. 5 is an enlarged cross-sectional diagram illustrating a second modification to the support of FIG. 3.

The side surface ss2 of the support 18 is inclined relative to the facing surface fs2 so as to spread outward as viewed from the direction perpendicular to the facing surface fs2. The side surface ss2 may be a flat surface, as illustrated in FIG. 3. When the side surface ss2 is configured to be a flat surface, the angle formed between the facing surface fs2 and the side surface ss2 may be greater than 90 degrees and less than 170 degrees. The side surface ss2 may be a curved surface protruding outward, as illustrated in FIG. 4. The side surface ss2 may be a curved surface recessed inward, as illustrated in FIG. 5.

The side surface ss2 may connect farther outward to a liquid retainer 19 when viewed in a direction perpendicular to the facing surface fs2, as illustrated in FIG. 3. The liquid retainer 19 is, for example, at an angle of less than 180 degrees relative to the side surface ss2 and may be curved.

Figure 6:
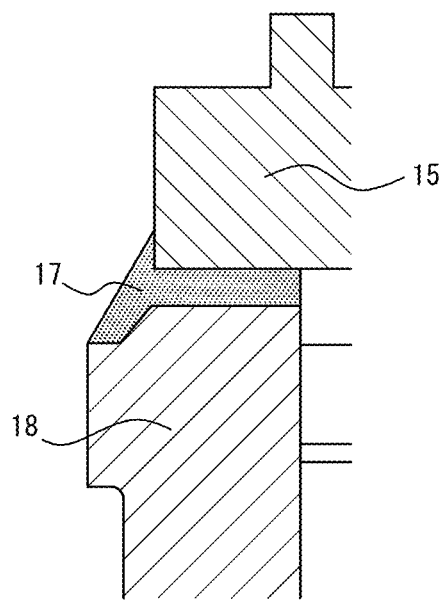
FIG. 6 is an enlarged cross-sectional diagram illustrating the configuration of the bonded structure of FIG. 2.

The adhesive body 17 is positioned between the first member 15 and the support 18 and fixes the first member 15 to the second member 16, as illustrated in FIG. 6. The adhesive body 17 extends along the support 18 in close contact from the facing surface fs2 to the side surface ss2. The adhesive body 17 has a fillet shape at an end thereof by the side surface ss2. The fillet shape is a shape that diverges in a direction perpendicular to the facing surface fs2 towards the end of the adhesive body 17 on the side surface ss2 side along a direction parallel to the facing surface fs2.

The adhesive body 17 may extend from the portion of the flat surface fs1 of the first member 15 facing the facing surface fs2 to the side surface ss1 while in close contact. The adhesive body 17 may have a fillet shape at the end thereof by the side surface ss1.

In greater detail, the adhesive body 17 is cured adhesive. A photocurable resin or a thermosetting resin, for example, may be used as the adhesive.

Next, a method of producing the bonded structure 14 is described.

Figure 7:
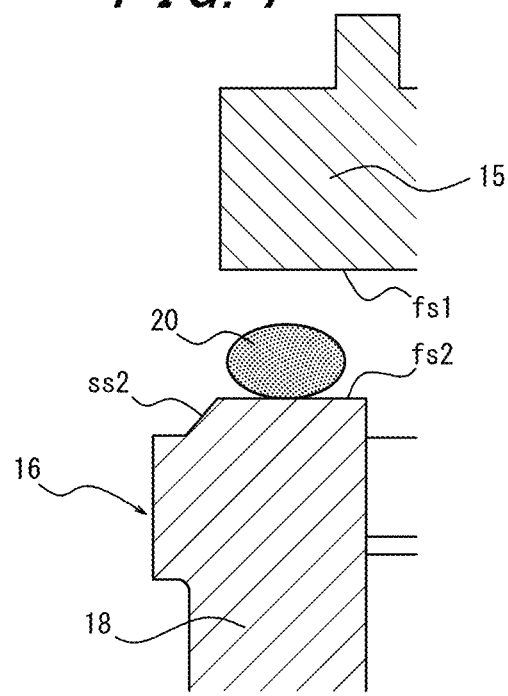
FIG. 7 illustrates a first step of a method of producing the bonded structure of FIG. 2.

The second member 16 is allowed to stand with the facing surface fs2 facing vertically upward, for example, as illustrated in FIG. 7. The second member 16 may be allowed to stand with the facing surface fs2 facing vertically downward or in any other direction. Adhesive 20 is applied near the end of the facing surface fs2 by the side surface ss2. The first member 15 is aligned relative to the second member 16 along the flat surface fs1 with the flat surface fs1 facing the facing surface fs2 above the second member 16.

Figure 8:
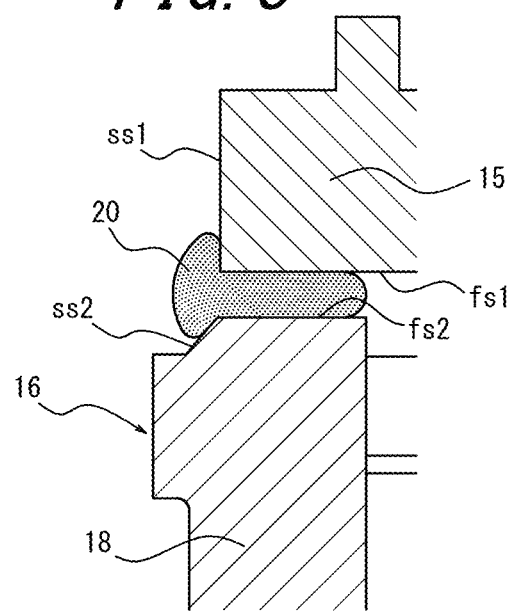
FIG. 8 illustrates a second step of a method of producing the bonded structure of FIG. 2.

The first member 15 is displaced vertically downward, as illustrated in FIG. 8. The adhesive 20 is compressed between the flat surface fs1 of the first member 15 and the facing surface fs2 of the support 18 by the displacement of the first member 15. By being compressed, the adhesive 20 extends towards the side surface ss1 of the first member 15 and the side surface ss2 of the support 18 and bulges out from the flat surface fs1 of the first member 15 and the facing surface fs2 of the support 18.

Figure 9:
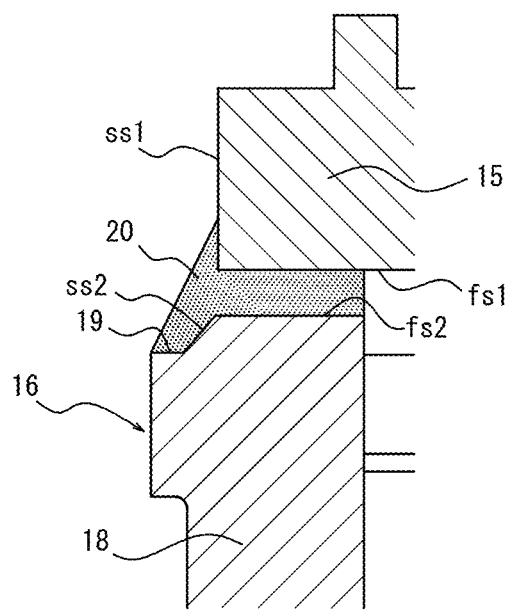
FIG. 9 illustrates a third step of a method of producing the bonded structure of FIG. 2.

The bulging portion of the adhesive 20 extends by spreading out at the support 18 side along the inclined side surface ss2 of the support. 18 and further along the surface of the liquid retainer 19, as illustrated in FIG. 9. The outer surface of the bulging portion of the adhesive 20 approaches a flat surface due to surface tension that narrows the outer surface in the space defined by the side surface ss1 of the first member 15, the side surface ss2 of the support 18, and the surface of the liquid retainer 19. Consequently, the adhesive 20 adopts a fillet shape at the side surface ss2 side of the support 18. The adhesive 20 also adopts a fillet shape at the side surface ss1 side of the first member 15. By being cured in this state, the adhesive 20 turns into the adhesive body 17, yielding the bonded structure 14.

Figure 10:
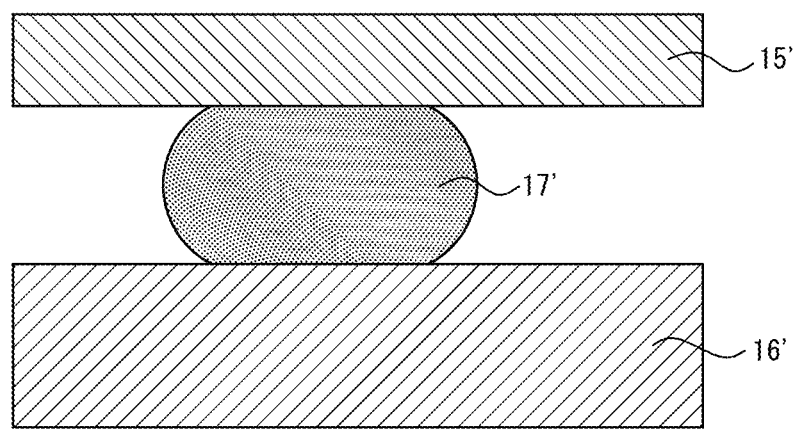
FIG. 10 is an enlarged cross-sectional diagram illustrating the configuration of a bonded structure in a first example in which the adhesive body is sandwiched only between flat surfaces of plate-shaped members.
Figure 11:
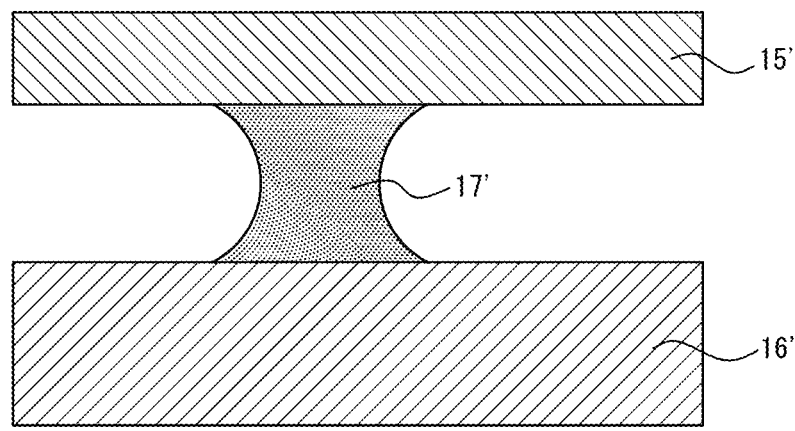
FIG. 11 is an enlarged cross-sectional diagram illustrating the configuration of a bonded structure in a second example in which the adhesive body is sandwiched only between flat surfaces of plate-shaped members.

In the bonded structure 14 of the present embodiment with the above configuration, the adhesive body 17 extends from the facing surface fs2 of the support 18 to the side surface ss2 and has a fillet shape at the end thereof by the side surface ss2. As illustrated in FIGS. 10 and 11, an adhesive body 17' that is sandwiched only between two members 15', 16' and is cured has a barrel or a bobbin shape. Stress therefore concentrates in a portion of the adhesive body 17', which may lead to cracking or detachment of the adhesive body 17'. In the bonded structure 14 with the above configuration, on the other hand, the adhesive body 17 has a fillet shape at the support 18 side. This relieves the concentration of stress inside the adhesive body 17 and can improve the fracture strength.

In the bonded structure 14 of the present embodiment, the adhesive body 17 extends from the flat surface fs1 of the first member 15 to the side surface ss1 and has a fillet shape at the end thereof by the side surface ss1. This configuration can improve the fracture strength of the bonded structure 14 at the first member 15 side as well.

As viewed from a direction perpendicular to the flat surface fs1 of the first member 15, the side surface ss1 of the first member 15 in the bonded structure 14 of the present embodiment is positioned inward from the side surface ss2 of the support 18. This configuration increases the size of the space that houses the portion of the adhesive 20 bulging towards the side surface ss1 of the first member 15 and the side surface ss2 of the support 18 during production of the bonded structure 14. The upper limit on the amount of the bulging portion that can form the fillet shape is thereby increased. Accordingly, the amount of adhesive 20 applied to form the fillet shape can be adjusted easily, and the fillet shape can be formed easily in the adhesive body 17 of the bonded structure 14.

Although the matter of the present disclosure has been explained with reference to the accompanying drawings and examples, it is to be noted that various changes and modifications will be apparent to those of ordinary skill in the art based on the present disclosure. Therefore, such changes and modifications are to be understood as included within the scope of the disclosure.

REFERENCE SIGNS LIST

10 Imaging apparatus
11 Moveable body
12 Imaging optical system
13 Image sensor
14 Bonded structure
15 First member
15' Member
16 Second member
16' Member
17, 17' Adhesive body
18 Support
19 Liquid retainer
20 Adhesive
fs1 Flat surface of first member
fs2 Facing surface of support
OA Optical axis
ss1 Side surface of first member
ss2 Side surface of support

The invention claimed is:

1. A bonded structure comprising:
a first member;
a second member comprising a support, the support including a facing surface facing the first member and a side surface inclined outward as viewed from the first member; and
an adhesive body positioned between the first member and the support, extending from the facing surface to the side surface, having a fillet shape at an end of the adhesive body by the side surface, and fixing the first member to the second member,
wherein the adhesive body extends from a flat surface of the first member facing the facing surface to a side surface of the first member,
the side surface of the first member extends in a different direction than the flat surface of the first member,
the support has a retainer surface extending outwardly from an outermost end of the side surface of the support when viewed in a direction perpendicular to the facing surface, the retainer surface extending in a direction different than the side surface of the support, and
the retainer surface is connected to the side surface of the support at the farthest distance from the first member in an optical axis direction.

2. The bonded structure of claim 1, wherein the adhesive body has a fillet shape at an end of the adhesive body by the side surface of the first member.

3. An imaging apparatus comprising:
the bonded structure of claim 2;
an image sensor mounted on the first member; and
an imaging optical system comprising at least one optical element and held by the second member so that an image is formed on an optical detection surface of the image sensor.

4. An imaging apparatus comprising:
the bonded structure of claim 1;
an image sensor mounted on the first member; and
an imaging optical system comprising at least one optical element and held by the second member so that an image is formed on an optical detection surface of the image sensor.

5. A moveable body comprising the imaging apparatus of claim 4.

* * * * *